United States Patent [19]
Lester

[11] Patent Number: 4,549,178
[45] Date of Patent: Oct. 22, 1985

[54] ENERGY CONTROL SYSTEM WITH TRANSMITTER HAVING CHANNEL MULTIPLEXING AND FREQUENCY MODULATION

[75] Inventor: James N. Lester, Rockport, Mass.

[73] Assignee: GTE Products Corporation, Stamford, Conn.

[21] Appl. No.: 540,723

[22] Filed: Oct. 11, 1983

[51] Int. Cl.⁴ .............................................. H04Q 9/00
[52] U.S. Cl. ......................... 340/825.58; 340/310 A; 331/108 D; 331/179; 315/312
[58] Field of Search ...................... 340/825.71, 825.76, 340/825.58, 310 A; 331/108 D, 172, 179, 47, 55, 1 R, 1 A; 332/16 R; 315/DIG. 2, 291, 312; 455/112, 113, 125

[56] References Cited

U.S. PATENT DOCUMENTS

| | | | |
|---|---|---|---|
| 3,613,025 | 10/1971 | Joosten, Jr. ........................... | 331/55 |
| 4,309,675 | 1/1982 | Rabe ..................................... | 331/172 |
| 4,320,357 | 3/1982 | Wulfsberg et al. .................. | 331/179 |

*Primary Examiner*—Donald J. Yusko
*Attorney, Agent, or Firm*—Thomas H. Buffton; Carlo S. Bessone

[57] ABSTRACT

A transmitter circuit adapted to transmit control signals to receivers which in turn activate fluorescent lamp fixtures. The transmitter comprises a frequency controllable oscillator and means coupled from the oscillator for providing alternating cycle control signals adapted to control the drive of the load. A divider circuit is used responsive to the oscillator frequency for providing a divided frequency signal of lower frequency of that of the oscillator. Feedback means including biphase means is responsive to the divided frequency signal and is coupled to the oscillator for controlling the oscillating frequency thereof. The oscillator output frequency is switchable at the divided frequency signal rate from a first frequency to a second frequency under control from the divider circuit. There is preferably also provided frequency modulation control of the oscillator and in this regard the output of the divider circuit couples by way of a frequency modulation wave shape circuit to the frequency modulation input of the frequency controllable oscillator. Zero crossing detecting circuitry is also provided to reduce power consumption.

19 Claims, 4 Drawing Figures

ENERGY CONTROL SYSTEM WITH TRANSMITTER HAVING CHANNEL MULTIPLEXING AND FREQUENCY MODULATION

BACKGROUND OF THE INVENTION

The present invention relates in general to an electronic circuit for transmitting control signals to one or more receivers which in turn activate a load, such as a fluorescent lamp fixture. More particularly, the present invention relates to a transmitter adapted to control the energization of ballasted loads, such as fluorescent lights, and incorporates delayed synchronous channel multiplexing and frequency modulation to provide enhanced system efficiency.

A fluorescent lighting control system is described in U.S. Pat. No. 3,971,010. This system employs a frequency sensitive receiver circuit used to apply power to a fluorescent lighting fixture upon receipt of a proper activation signal. A radio frequency transmitter generates the control signals which are coupled through the lighting system power lines to the receivers. One of the problems associated with this system is that as more power receivers are added to the system, transmitter power requirements increase substantially. This increase in power requirements makes for a relatively complex and costly system particularly as the system requirements increase.

In other transmitter designs presently in use the efficiency of the product is relatively low. In one known design the efficiency is only at 25% (power out/power in) with most of the power being consumed in the output power transistors. Also, there is a need in existing systems for relatively complex field adjustments and adjustments in which the final settings are not necessarily independent. In one transmitter design there are actually a total of twelve field adjustments that are to be made. Furthermore, many of these adjustments require the use of special purpose tools.

Another problem associated with present transmitter designs is that they are adapted to have a continuous power output even after the receiver is turned on. This has the effect of increasing the cooling requirements and also is instrumental in increasing the cost of the overall device.

Also, with existing transmitters, cross channel interference exists providing undesired odd modulation and beat frequencies. Audible noise is generated as well as undesired off channel frequencies which further reduce field receiver yields and also reduce output transistor life.

OBJECTS OF THE PRESENT INVENTION

Accordingly, it is an object of the present invention to provide an improved transmitter for furnishing control signals to one or more receivers which in turn activate a load such as a fluorescent lamp fixture.

Another object of the present invention is to provide a transmitter circuit that can be made more inexpensively than previous designs.

A further object of the present invention is to provide a transmitter circuit that has improved efficiency.

Still another object of the present invention is to provide a transmitter circuit in which the power requirements are minimized whereby the control is such that the application of power is tailored so that it is applied only for substantially the first millisecond or so after each zero crossing of each line phase.

Still a further object of the present invention is to provide a transmitter circuit as in accordance with the preceding object and which is characterized by less heat dissipation and a decreased requirement for cooling capacity.

Another object of the present invention is to provide a transmitter system in which the previous problems mentioned hereinbefore in connection with cross channel interference have been substantially eliminated.

Still another object of the present invention is to provide a transmitter circuit which has very simple field adjustments.

SUMMARY OF THE INVENTION

The foregoing and other objects are achieved in one aspect of this invention by a transmitter which is preferably in the form of an electronic circuit adapted to transmit control signals to receivers which in turn activate a load, which may be in the form of a fluorescent lamp fixture, for example. The transmitter comprises a frequency controllable oscillator (free running astable oscillator) and means coupled therefrom for providing alternating cycle control signals adapted to control drive of the load. This latter means may comprise a flip-flop oscillator in which case the oscillator is adapted to operate at a frequency twice the desired operating frequency. In the disclosed embodiment the oscillator is controlled to operate at a frequency of say either 60 KHZ or 105 KHZ. The biphase signals from the flip-flop couple to the output power transistors through a driver stage that is adapted to isolate the logic circuitry from the power transistors and furthermore controls switching timing to maximize circuit efficiency. There is also provided a means responsive to the oscillator frequency, which preferably is a divider circuit for providing a divided frequency signal of lower frequency than that of the oscillator. This divider circuit may be connected from the output of the aforementioned flip-flop. Feedback means couple from the divider circuit to the control inputs of the oscillator includes a biphase means which may be a second flip-flop responsive to the divided frequency signal and for controlling the oscillator. The oscillator output frequency is switched at the divided frequency signal rate from a first frequency which may be the aforementioned 60 KHZ to a second frequency which may be the aforementioned 105 KHZ. Also, the output of the divider circuit is preferably passed through an FM waveshape circuit that causes FM modulation of the oscillator and therefore of the transmitted frequency. This FM modulation may be at, for example, ±5 KHZ. Means are also provided for disabling one or both generated frequencies.

BRIEF DESCRIPTION OF THE DRAWINGS

Numerous other objects, features and advantages of the invention should now become apparent upon a reading of the following detailed description taken in conjunction with the accompanying drawings, in which.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
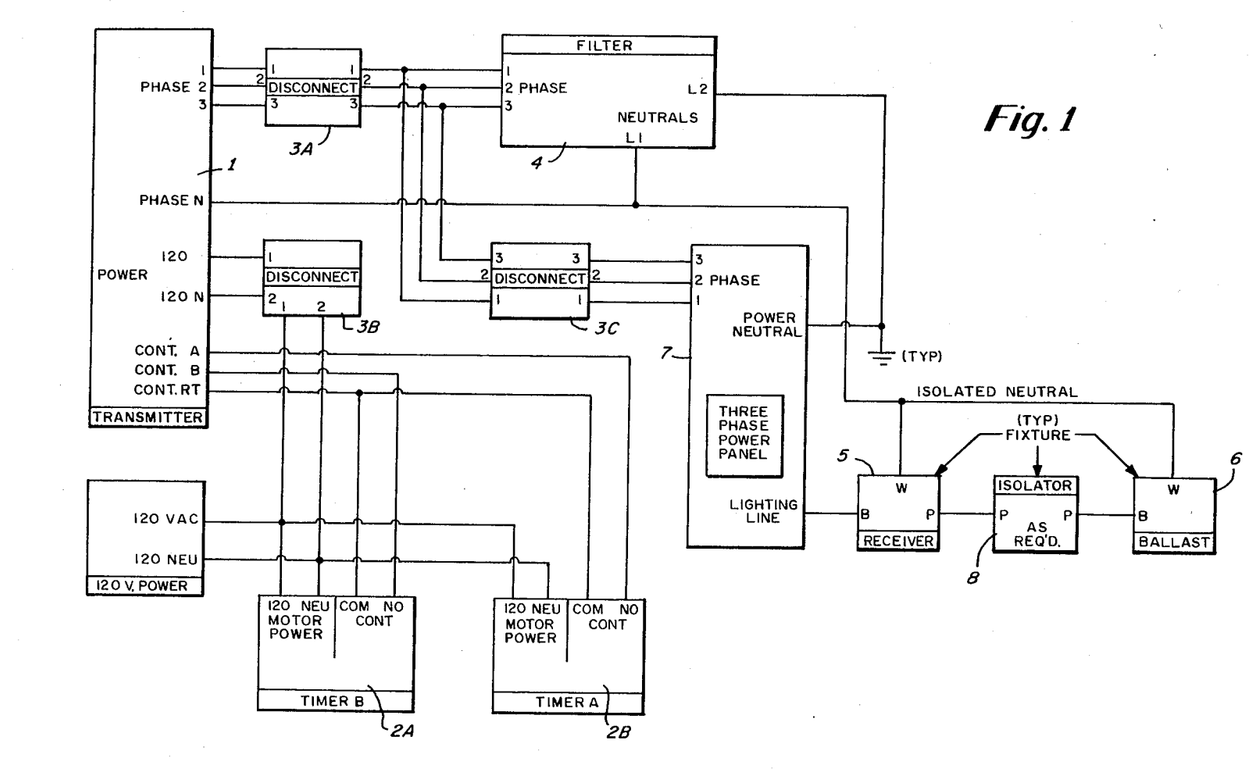
FIG. 1 is a general block diagram showing a system wiring diagram for a basic energy control lighting system.

FIG. 1 illustrates a typical system wiring diagram showing the incorporation of the transmitter of this invention in an energy control device (ECD) system in which control signals are coupled to receivers which in turn activate, for example, fluorescent lamp fixtures. FIG. 1 shows the transmitter 1 along with two mechanical timers 2A and 2B. Alternatively, these timers could be replaced by computer control inputs. The timers cycle the transmitter frequencies on and off. Also depicted in FIG. 1 are three quick disconnect switches 3A, 3B and 3C. These switches enable the isolation of the different parts of the system during installation set up and during future servicing.

A line filter 4 serves to isolate the transmitted signal from the rest of the power distribution system (non-lighting circuits). Any noise generated in the external power system is blocked by the filter force so that the receivers are not falsely triggered on. In FIG. 1, one receiver 5 is shown along with a ballast unit 6.

With regard to the false triggering of the receivers, it is noted that, for example, battery charges affect the system. The filter 4 also minimizes RF energy conduction beyond the confines of the lighting system. The filter 4 isolates the lighting neutrals as indicated in FIG. 1.

The power out of the three phase lighting distribution panel 7 is coupled to the fluorescent ballast 6 by way of the receiver 5 and, when necessary, the isolator 8. The isolator 8 blocks the transmitted signal so that the low RF impedance ballast does not load down the transmitter. It also isolates noisy ballasts from the sensitive receiver 5. Upon receipt of a transmitted signal, the receiver couples 60 HZ power to the ballast thereby lighting the fixture.

Figure 2:
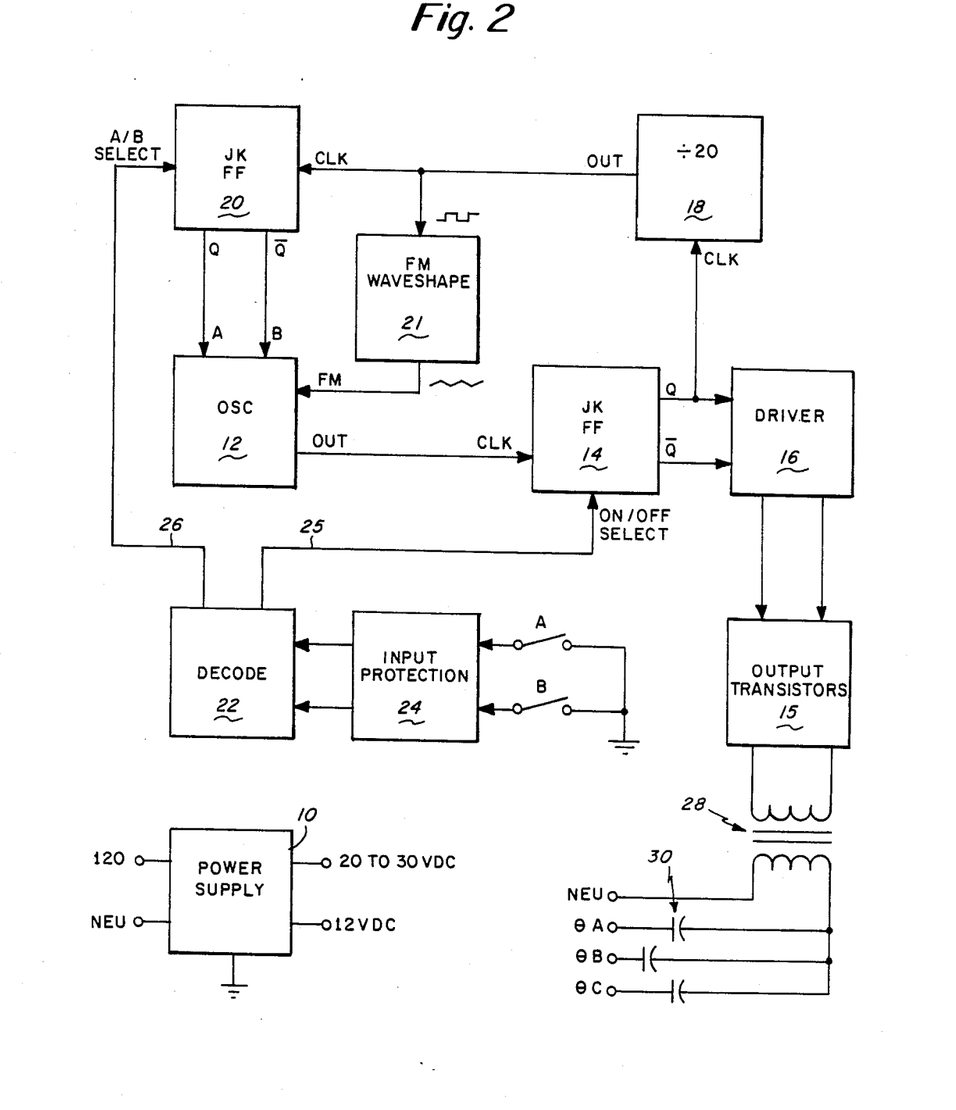
FIG. 2 is a block diagram of the transmitter illustrated in FIG. 1.

FIG. 2 is a block diagram of the new transmitter of the present invention. In FIG. 2 power is obtained from a 120 VAC line which is coupled to the power supply 10. The power supply 10 converts the input AC voltage to a high power voltage of 25±5 VDC and a low power logic and control voltage of 120 VDC. These voltages are preferably regulated voltages.

A free running astable oscillator 12 sends a signal to the clock input of a flip-flop 14 at a frequency of either 60 KHZ or 105 KHZ, both of which are twice the desired operating frequencies. The flip-flop 14 acts as a binary divider and its Q and $\overline{Q}$ outputs alternately switch high and low in a biphase manner.

This biphase signal is coupled to the output power transistors 15 through a driver stage 16 that isolates the logic circuitry from the power transistors 15 and controls switching timing to maximize circuit efficiency.

One of the biphase signals (Q) connects to a divide-by-20 logic circuit 18 which in turn triggers another flip-flop 20. The second flip-flop controls the operating frequency of the oscillator 12 and every 20 cycles it switches so that twenty cycles of each desired frequency is transmitted in an alternate or multiplexed manner. Since the switching rate is derived from the actual transmitted signal, it is synchronized.

The output of the divide-by-20 circuit 18 is changed from a square wave to a triangular wave of a magnitude that causes about ±5 KHZ of FM modulation of the oscillator 12 and therefore the transmitted frequency. There is a separate FM input to the oscillator 12 as illustrated in FIG. 2 from the FM waveshape circuit 21.

A means has been provided for disabling one or both frequencies including input control signal means. Note in FIG. 2 the input control switches A and B. The input control signals are coupled to a decoder network 22 by way of the input protection network 24. One output of the decoder at line 25 controls the first flip-flop 14 and can disable all signals. The other output on line 26 from the decoder 22 selects the desired frequency of operation by way of the flip-flop 20.

In FIG. 2 the output power transistors 15 couple their signal through an isolation and impedance matching transformer 28 and also through 60 HZ blocking capacitors 30 to the three phase lighting system.

Figure 3:
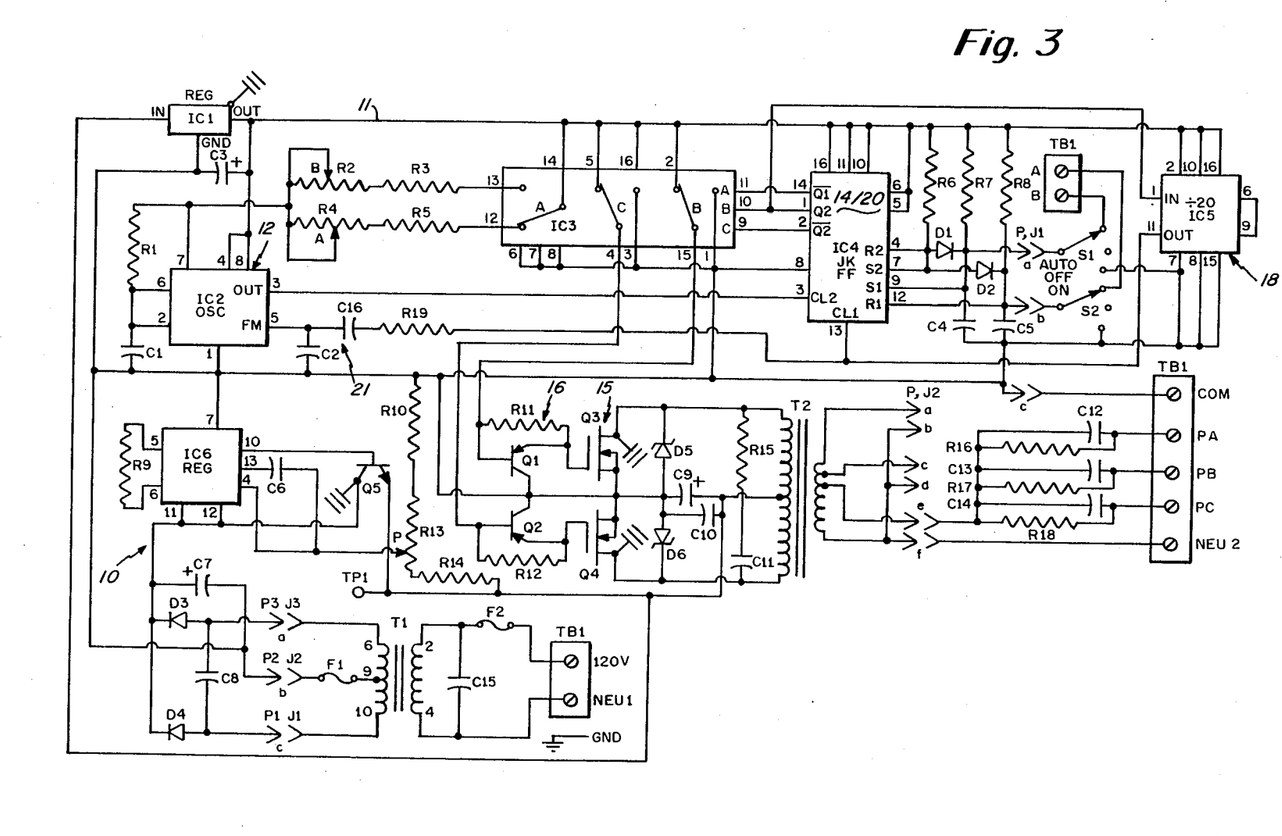
FIG. 3 is a detailed circuit diagram of the transmitter shown in the block diagram in FIG. 2.

Reference is now made to FIG. 3 which shows a detailed circuit for the transmitter. In FIG. 3 input power of 120 VAC is applied to terminal TB1 and is coupled through protection fuse F2, to noise suppression capacitor C15 and the primary of the isolating input transformer T1. Transformer T1 steps the voltage down to 56 VAC and provides line neutral and voltage transient isolation to protect the solid state circuitry.

The 56 VAC voltage is full-wave rectified by diodes D3 and D4 and filtered by capacitor C7 to provide a voltage of 40 VDC. Capacitor C8 acts to suppress input power line noise that may get by transformer T1 and capacitor C15. Fuse F1 protects the secondary circuit of the transformer. Plugs P1, P2 and P3, and Jacks J1, J2 and J3 couple the various circuit sections together.

The unregulated 40 VDC level is fed to voltage regulation circuitry including integrated circuit IC6 which is a low power voltage regulator. Transistor Q5 amplifies the power and supplies a regulated 20 to 30 VDC to test point TP1. Resistors R10, R13 and R14 provide a feedback sense voltage to circuit IC6 and limits the regulated voltage range to 25±5 VDC as resistor 13 is varied. Capacitor C6 improves the regulators transient response to load changes and resistor R9 improves the thermal stability of the regulator circuit. Capacitors C9 and C10 provide additional regulated voltage filtering and are placed near the output power transistors Q3 and Q4 to minimize regulated supply line ringing due to parasitic circuit inductance. Transistors Q3, Q4 and Q5 are preferably all mounted on a heat sink for cooling.

The regulated voltage at test point TP1(25±5 VDC) is connected directly to the high power output circuitry and indirectly to the low power digital logic control and drive circuitry through additional voltage regulator IC1 which provides 12 VDC to the low power circuits at line 11. Capacitor C3 provides additional 12 VDC noise filtering. Circuit IC1 is preferably mounted on a heat sink for cooling.

The oscillator 12 of FIG. 2 is illustrated in FIG. 3 by the integrated circuit IC2 which is a free running astable oscillator which operates at twice the desired output frequencies of 30 KHZ and 52.5 KHZ, or 60 KHZ and 105 KHZ. Timing capacitor C1 is alternately charged and discharged by circuit IC2 and resistors R1, R2 and R3 or resistors R1, R4 and R5 as selected by integrated circuit analog transmission switch IC3. The oscillator circuit IC2 operates at one of two frequencies which are determined by the selected resistor network. Resistors R2 and R4 allow the two frequencies of operation to be trimmed over a ±10 KHZ range. Terminal 5 of circuit IC2 is a frequency modulation input. Resistor R19 and capacitors C2 and C16 provide a frequency modulation signal to circuit IC2 from integrated circuit counter IC5. Resistor R19 and capacitors C2 and C16 thus form the aforementioned FM waveshape circuit 21 (see FIG. 2). Capacitor C2 performs a dual function by also providing a noise bypass at the frequency modulation input of circuit IC2.

The square wave output of circuit IC2 is coupled to the clock #2 input of integrated circuit dual JK flip-flop IC4. The circuit IC4 corresponds to the flip-flops 14 and 20 in the block diagram of FIG. 2. The Q2 outputs of circuit IC4 correspond to flip-flop 14 and the Q1 outputs correspond to flip-flop 20. Each time a pulse is received the outputs Q2 and $\overline{Q2}$ alternately switch high and low which effectively divides the oscillator frequency by two, producing the desired signal frequencies. The outputs Q2 and $\overline{Q2}$ are coupled to the B and C control inputs, respectively, of circuit IC3. Solid state switches B and C, which are internal to circuit IC3, alternately connect 12 volts and ground to output pins 4 and 15. The two signals are coupled from pins 4 and 15 to the power output circuitry.

The signals from circuit IC3 (corresponding to controls B and C) are coupled to charge resistors R11 and R12, and discharge transistors Q1 and Q2. Output power transistors Q3 and Q4 (output 15 in FIG. 2) are alternately turned on and off providing a power amplified signal to output coupling transformer T2. Resistors R11 and R12 cause the internal gate capacitors of the output transistors to be slowly charged thereby causing the transistors to turn on slowly. The resistors R11 and R12 also aid in isolating the power transistors from the low power integrated circuit IC3. The transistors Q1 and Q2 discharge the gate capacitors C9 and C10 of the output transistors rapidly thereby causing the transistors to turn off quickly. Should transistors Q3 and Q4 be simultaneously energized, high peak currents will flow in both transistors which causes the devices to unnecessarily heat up and reduce circuit efficiency. The described gate drive circuitry eliminates dual "on" condition overlap problems.

Voltage is alternately applied to the two halves of each of the primary winding of transformer T2 by transistors Q3 and Q4. The peak voltage on each half is two times the regulated voltage at test point TP1 or 50±10 V peak so the total voltage across the primary of transformer T2 is 100±20 V peak to peak. The secondary of transformer T2 reduces this voltage to one of three levels as selected by output taps at a, c and e. The three output levels are 23, 16.5 and 11.5 V peak to peak which correspond to three output power levels. Adjustment of the regulated voltage at test point TP1 provides additional output power adjustment range. Normally, output power is minimized to improve the overall ECD lighting system efficiency.

Transformer T2 acts to isolate the transmitter circuitry from the lighting system. Resistor R15 and capacitor C11 form an RC snubber network to supress voltage transients from transformer T2 that are generated each time Q3 and Q4 switch. Zener diodes D5 and D6 protect transistors Q3 and Q4 from longer duration transients as might be received from the lighting system via transformer T2 and the output capacitors.

Plug and jack assembly P2 and J2 couple the signals from transformer T2 through capacitors C12, C13 and C14 to the three phases of the lighting system at terminal block TB1. The capacitors act to block the 60 HZ line voltage from the low impedance output of transformer T2 while simultaneously coupling the signals onto the three phases without loss.

The remaining circuitry acts in a digital manner to control which frequency is output. The Q2 signal out of circuit IC4 is coupled to the clock input of integrated circuit counter IC5 (counter 18 in FIG. 2) which is configured to count by 20. The output of circuit IC5 is therefore one twentieth of the input signal. It is applied to the clock #1 input of circuit IC4 and to the frequency modulation conditioning circuit 21 which takes the square wave signal and integrates it, providing a triangular frequency modulation signal to circuit IC2 (oscillator 12 in FIG. 12). This provides a nearly linear frequency sweep of ±5 KHZ at the desired operating frequencies.

Every twenty cycles circuit IC5 toggles the clock #1 input of flip-flop circuit IC4. Unless inhibited in any way, the outputs Q1 and $\overline{Q1}$ will alternately switch high and low. Only output $\overline{Q1}$ is used to provide a signal to the A control input of circuit IC3 thereby toggling internal switch A and alternately connecting the R2/R3 and R4/R5 resistor networks to oscillator IC2. Unless inhibited, the oscillator frequency therefore changes every 20 cycles. This produces a frequency multiplexing action and effectively causes the output signal to the lighting system to switch at nearly a 1 KHZ rate between the 30 and 52.5 KHZ frequencies. Both ECD receivers are activated in this mode.

The counter 18 (circuit IC5) provides a dual function. First, in combination with circuits IC2, IC3 and IC4, it provides a means for synchronous switching which reduces output transistor losses relative to traditional methods. Secondly, the tuned detection circuits of the receivers do not respond instantly to input signals but rather respond exponentially in applying the detected signal to their power control triacs. This reduces noise sensitivity of the receiver and requires that several cycles as sent from the transmitter before signal detection occurs. Signals are detected within 15 cycles and thus circuit IC5 is configured to allow the transmission of 20 cycles before switching frequencies. Concern must be given to delay the signal to the receiver by counting too many cycles as it is desired to turn the light fixture on when the power line voltage is near zero to minimize loss of ballast voltage and triac turn-on noise. Twenty cycles causes of a delay of $\frac{1}{2}$ to 1 msec which is acceptable while 40 cycles would cause up to 2 msec of delay which is too much. Any value between 15 and 30 cycles should be acceptable. In a lighting system, most receivers are activated within 5 cycles so 20 allows a sufficient steady state condition to be reached before switching frequencies.

It was stated earlier that this multiplex action continues unless inhibited. Circuit IC4 performs the additional function of inhibiting either or both frequencies by decoding remote input control signals at terminal board TB1 or local control signals as selected by switches S1 and S2 (A and B in FIG. 2). The control signals can be either a logic low or a logic high. Pull up resistors R6, R7 and R8 allow either a remote switch or TTl logic to be used to drive circuit IC4 which is a CMOS circuit and therefore inherently compatible with remote control CMOS circuitry. The capacitors C4 and C5 suppress control line noise which could cause random frequency shifting.

The control signals are applied to set/reset lines R1, S1, R2 and S2 of circuit IC4. When R2 and S2 are both at a logical high level, the Q2 and $\overline{Q2}$ outputs both go high thereby activating switches B and C of circuit IC3 which couple a signal of zero volts to the output power stages thereby maintaining the output transistors in an off condition. Since no signal is transmitted, all receivers are off.

When either control line is grounded (logical low level), R2 and S2 are pulled low via steering diodes D1 and D2 allowing the desired frequency or frequencies to be transmitted. The state of the R1 and S1 lines determine whether a single or multiplexed frequency is transmitted. If both lines are low, the output $\overline{Q1}$ is toggled high and low and causes both frequencies to be transmitted turning on both receiver types. If only S1 is grounded and R1 is left high, $\overline{Q1}$ stays high closing the A switch in circuit IC3. This activates the B resistor network, R2 and R3, and causes only the 30 KHZ frequency to be transmitted, turning on only B receivers. Similarly if R1 is grounded and S1 is high, only the 52.5 KHZ frequency is transmitted.

The following logic table summarizes the above-described control signals:

TABLE

| FREQ. | Control Logic at IC4 inputs | | | |
|---|---|---|---|---|
| | R1 | S1 | R2 | S2 |
| 30 | HIGH | LOW | LOW | LOW |
| 52.5 | LOW | HIGH | LOW | LOW |
| BOTH | LOW | LOW | LOW | LOW |
| NONE | ANY | ANY | HIGH | HIGH |

The transmitter of the present invention is characterized by a number of important features including the fact that two frequencies of operation are multiplexed, thereby eliminating many duplicate components. Furthermore, this multiplexing is performed in a synchronous manner. The circuit that is described counts output cycles and allows the transmission of a sufficient number of cycles to insure receiver turn-on in a multiplexed mode. There is preferably one oscillator to generate two frequencies in this multiplexed mode. Another feature of the present invention is that the circuit allows independent on-off control of the desired transmitted frequencies. Another feature is that the circuit drives V-MOS power transistors while simultaneously isolating the power transistors from the low power logic circuitry. Still a further feature is that the circuit frequency modulates the frequency transmitted signal. Another feature of the present invention is concerned with the power supply which generates both high and low power voltages. The circuit of this invention couples the RF energy to a three phase lighting system.

In accordance with the present invention, by synchronously switching from one channel frequency to the other, the losses in the output transistors are minimized allowing cooler and unvented operation. Synchronous switching also allows modulation frequencies as high as 18.75 KHZ, making the transmitter substantially void of any appreciable audio noise. Frequency modulation allows a wider distribution of receivers to be used. Frequency modulation also may eliminate field adjustments altogether which greatly simplifies the field installations. The line synchronized amplitude modulation that is employed in accordance with the invention considerably reduces the average transmitter power by gating the transmitter on only when required, i.e., the receiver only need a resonant pulse of energy during zero crossings of the AC power line. Once a receiver turns on, it latches on until the next zero crossing of the line which means the transmitter may then shut off. Average transmitter power can thus be reduced by 60%. This also has the effect of greatly lessening cooling requirements.

As a specific example but in no way to be construed as a limitation, the following components are appropriate to an embodiment of the present disclosure, as illustrated by FIG. 3:

| Designation | Description |
|---|---|
| C1 | Capacitor 1000 PF, 100 V, Polystyrene |
| C2 | Capacitor 0.1 MFD, 50 V, Disk |
| C3 | Capacitor 10 MFD, 15 V, Tant. |
| C4 | Capacitor 0.1 MFD, 50 V, Disk |
| C5 | Capacitor 0.1 MFD, 50 V, Disk |
| C6 | Capacitor 0.01 MFD, 50 V, Disk |
| C7 | Capacitor 5500 MFD, 50 V, Mallory Type CGS or equal |
| C8 | Capacitor 0.1 MFD, 200 V, Mylar |
| C9 | Capacitor 150 MFD, 50 V, Electrolytic |
| C10 | Capacitor 0.1 MFD, 50 V, Disk |
| C11 | Capacitor 1000 PF, 100 V, Polystyrene |
| C12 | Capacitor 10 MFD, 330 VAC, Protected, Sprague Type 325 P |
| C13 | Capacitor 10 MFD, 330 VAC, Protected, Sprague Type 325 P |
| C14 | Capacitor 10 MFD, 330 VAC, Protected, Sprague Type 325 P |
| C15 | Capacitor 0.01 MFD, 1000 V, Disk |
| C16 | (optional) Capacitor 0.1 MFD, 50 V, Disk |
| D1 | Diode 1 A, 100 V |
| D2 | Diode 1 A, 100 V |
| D3 | Diode 6 A, 200 V |
| D4 | Diode 6 A, 200 V |
| D5 | Diode, Zener, 60 V, 5 W |
| D6 | Diode, Zener, 60 V, 5 W |
| F1 | Fuse 3 A, 3 B |
| F2 | Fuse 1.5 A, 3 AG |
| I C1 | Regulator, 12 V, 1 A, LM340T-12 or 7812 or equal |
| I C2 | Oscillator, LM555CN or equal |
| I C3 | Analog Switch, CD4053BE or equal |
| I C4 | Dual JK Flip Flop, CF4027BE or equal |
| I C5 | Counter, CD4518BE or equal |
| I C6 | Regulator, CA723CE or equal |
| J1 (a-c) | Jack Panduit, HFSS156 - 3-C |
| J2 (a-f) | Jack Panduit, HFSS156 - 2-C |
| J3 (a-c) | Jack Panduit, HFSS156 - 4-C |
| P1 (a-c) | Plug Panduit, CE156F18 - 3-C |
| P2 (a-f) | Plug Panduit, CE156F18 - 2-C |
| P3 (a-c) | Plug Panduit, CE156F18 - 4-C |
| Q1 | Transistor 0.6 A, 40 V, 2N4403 or equal |
| Q2 | Transistor 0.6 A, 40 V, 2N4403 or equal |
| Q3 | Transistor 5 A, 100 V, 40 W, IRF520 or equal |
| Q4 | Transistor 5 A, 100 V, 40 W, IRF520 or equal |
| Q5 | Transistor 7 A, 70 V, 65 W, 2N6292 or equal |
| R1 | Resistor 1K ohm, ¼ W |
| R2 | Resistor Potentiometer, 10K ohm, ½ W |
| R3 | Resistor 10K ohm, ¼ W |
| R4 | Resistor Potentiometer, 10K ohm, ½ W |
| R5 | Resistor 5.1K ohm, ¼ W |
| R6 | Resistor 5.1K ohm, ¼ W |
| R7 | Resistor 5.1K ohm, ¼ W |
| R8 | Resistor 5.1K ohm, ¼ W |
| R9 | Resistor 22K ohm, ¼ W |
| R10 | Resistor 22K ohm, ¼ W |
| R11 | Resistor 1K ohm, ¼ W |
| R12 | Resistor 1K ohm, ¼ W |
| R13 | Resistor Potentiometer, 10K ohm, ½ W |
| R14 | Resistor 62K ohm, ¼ W |
| R15 | Resistor 82 ohm, 2 W, Carbon Composition |
| R16 | Resistor 330K ohm, 2 W |
| R17 | Resistor 330K ohm, 2 W |
| R18 | Resistor 330K ohm, 2 W |

-continued

| Designation | Description |
|---|---|
| R19 | (optional) Resistor 56K ohm, ¼ W |

Figure 4:
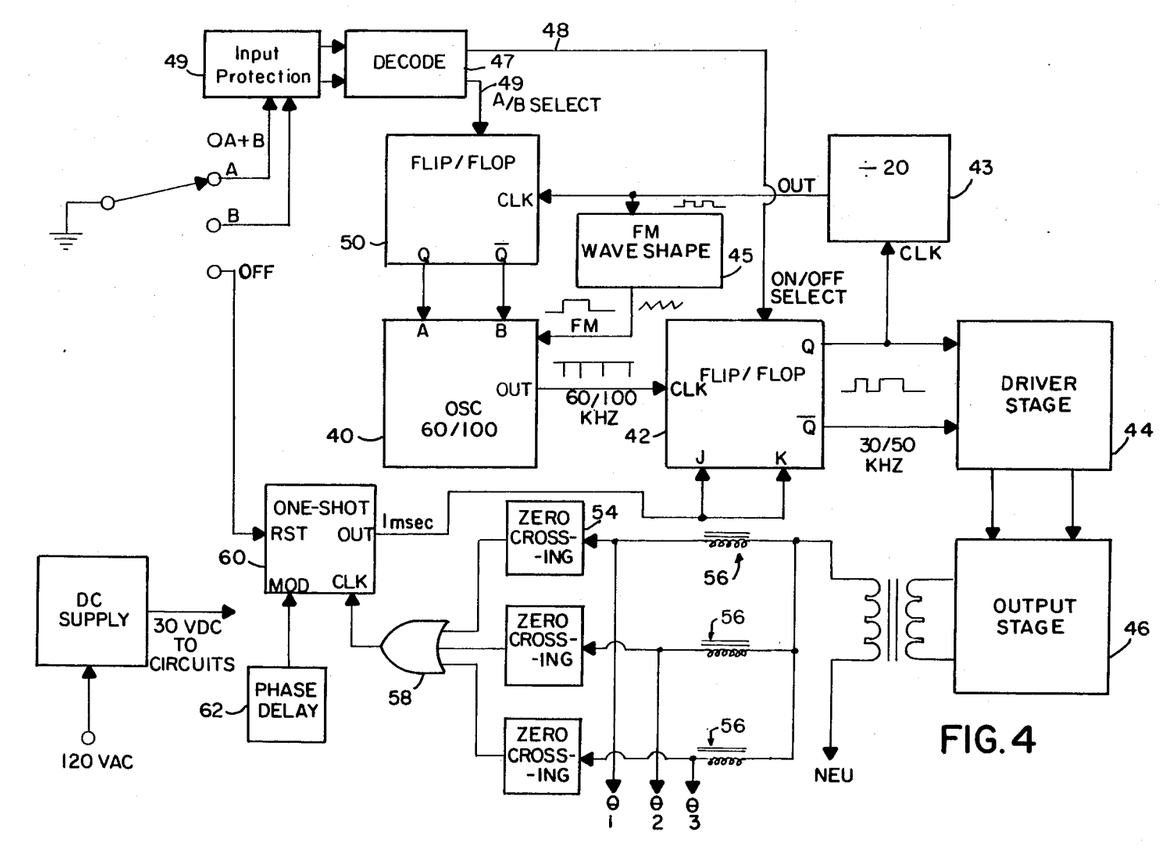
FIG. 4 is a block diagram of an alternate embodiment of the invention additionally employing zero crossing circuitry.

FIG. 2 herein has described a block diagram of the transmitter of the invention incorporating synchronous channel switching and frequency modulation. A similar block diagram is also now depicted in FIG. 4. However, FIG. 4 also incorporates zero crossing circuitry into the system. In FIG. 4 there is shown a frequency controllable oscillator 40. The output of the frequency controllable oscillator 40 is coupled to a digital flip-flop 42 which divides the generated frequencies by two. The output of the flip-flop 42 is coupled by a driver stage 44 to an output stage 46. The flip-flop 42 drives the transmitter output stages which send the necessary signals to the receivers. One output of the flip-flop 42, the "Q" output, is coupled by way of a divide-by-20 logic circuit 43 to a second flip-flop 50 which, in turn, controls the frequency of the oscillator 40. Every 20 cycles the oscillator 40 is switched so that 20 cycles of each desired frequency is transmitted in an alternate or multiplexed manner. Since the switching rate is derived from the actual transmitted signal, it is synchronized therewith.

Also, the output of the divide-by-20 circuit 43 is altered from a square wave to a triangular-shaped wave of a magnitude which provides about ±5 KHZ of FM modulation of the oscillator 40 and, therefore, of the transmitted frequency. Thus, the oscillator 40 receives a separate FM input from an FM waveshape circuit 45 coupled to the divide-by-20 circuit 43.

A means has been provided for disabling one or both frequencies of the system including an input control signal means. Note the input control switches designated A and B. The input control signals are coupled to a decoder network 47 by way of an input protection network 49. One output of the decoder network 47 at a line 48 controls the flip-flop 42 and can disable all signals thereto. The other line 49 from the decoder network 47 selects the desired frequency of operation by way of the flip-flop 50.

FIG. 4 also shows zero crossing circuitry which is adapted to gate the transmitter on only when it is needed at lamp line voltage zero crossings. The inputs to the zero crossing detectors 54 has associated inductors 56 that block the higher frequency signals and allow only the 60 cycle signal to pass. The output of each zero crossing detector is coupled to an OR gate 58. The output of the gate 58 couples to and triggers a one millisecond one shot multivibrator 60. The one shot 60 is then used to gate the output flip-flop 42 on and off which generates the required line synchronized amplitude modulation. There may also be provided a modulation signal from phase delay circuit 62 which couples to a modulation input of the one shot 60 to control lamp intensity when a dimming ballast is used.

Having now described a preferred embodiment of the present invention, it should now be apparent to those skilled in the art that numerous other embodiments are contemplated as following within the scope of this invention. For example, reference has been made herein to a three phase lighting load but the system also works on any number of phases including a single phase system. Reference has also been made to the use of two frequencies of operation. However, the circuit may also be constructed in an alternate embodiment to provide additional channels by some modification of the logic circuitry.

What is claimed is:

1. A transmitter system for generating control signals for controlling at least one load, said system comprising:
    a frequency controllable oscillator;
    means coupled from said oscillator for providing alternating cycle control signals to control drive of said load;
    means responsive to the oscillator frequency for providing a divided frequency signal of lower frequency than that of the oscillator; and
    feedback means including biphase means responsive to said divided frequency signal coupled to and for controlling said oscillator;
    whereby the oscillator output frequency is switchable at the divided frequency signal rate from a first frequency to a second frequency.

2. A transmitter system as set forth in claim 1 wherein said load comprises a fluorescent lamp fixture.

3. A transmitter system as set forth in claim 1 wherein said means coupled from said oscillator for providing alternating cycle control signals comprises a first flip-flop.

4. A transmitter system as set forth in claim 3 wherein said means responsive to the oscillator frequency for providing a divided frequency signal comprises a divider circuit.

5. A transmitter system as set forth in claim 4 wherein said divider circuit is coupled from one of the two ascertion/negation outputs of the first flip-flop.

6. A transmitter system as set forth in claim 5 wherein said biphase means comprises a second flip-flop.

7. A transmitter system as set forth in claim 6 including means coupling the output of the divider circuit to the clock input of the second flip-flop.

8. A transmitter system as set forth in claim 7 wherein both said first and second flip-flops are J-K type flip-flops.

9. A transmitter system as set forth in claim 1 wherein said means responsive to the oscillator frequency for providing a divided frequency signal comprises a divider circuit providing division in the range of 15-30.

10. A transmitter system as set forth in claim 1 further including a frequency modulation circuit receiving said divided frequency signal and having its output coupled to the oscillator.

11. A transmitter system as set forth in claim 10 wherein said oscillator has a frequency modulation input and the output of the frequency modulation circuit couples to the frequency modulation input of the oscillator.

12. A transmitter system as set forth in claim 1 further including an input control network for selectively disabling at least one frequency from said oscillator.

13. A transmitter system as set forth in claim 12 wherein said input control network comprises a decoder network.

14. A transmitter system as set forth in claim 13 wherein said biphase means comprises a flip-flop circuit with the output of said decoder coupling to said flip-flop circuit.

15. A transmitter system as set forth in claim 1 further including zero crossing means having a monostable means for controlling said means coupled from the oscillator for providing alternating cycle control signals.

16. A transmitter system as set forth in claim 15 wherein said zero crossing circuitry comprises multiple zero crossing detectors and at the output thereof a gate means.

17. A transmitter system for generating control signals for controlling at least one load comprising:

a frequency controllable oscillator;

means coupled from said oscillator for providing alternating cycle control signals for controlling drive of the load;

means responsive to the oscillator frequency for providing a divided frequency signal of lower frequency than that of the oscillator;

and means for generating from said divided frequency signal a frequency modulation signal;

and means coupling the frequency modulation signal to a frequency modulation input of said oscillator.

18. A transmitter system as set forth in claim 17 further including feedback means having a biphase means responsive to the divided frequency signal for controlling the oscillator output frequency so that it is switchable at the divided frequency signal rate from a first frequency to a second frequency.

19. A transmitter system as set forth in claim 17 wherein said means coupled from said oscillator for providing alternating cycle control signals comprises a first flip-flop and said biphase means comprises a second flip-flop.

* * * * *